(12) United States Patent
Kumar

(10) Patent No.: US 8,046,472 B2
(45) Date of Patent: Oct. 25, 2011

(54) SYSTEM AND METHOD FOR EXPERT SERVICE PROVIDERS TO PROVIDE ADVICE SERVICES THROUGH UNIQUE, EMPOWERED INDEPENDENT AGENTS TO CONSUMERS

(76) Inventor: Gopesh Kumar, Pleasanton, CA (US)

( * ) Notice: Subject to any disclaimer, the term of this patent is extended or adjusted under 35 U.S.C. 154(b) by 1843 days.

(21) Appl. No.: 10/711,549

(22) Filed: Sep. 24, 2004

(65) Prior Publication Data

US 2006/0075104 A1    Apr. 6, 2006

(51) Int. Cl.
*G06F 15/16* (2006.01)
(52) U.S. Cl. .......... 709/227; 709/202; 709/230; 705/38; 705/40; 379/114; 379/265
(58) Field of Classification Search .................. 709/218, 709/202, 227, 230, 205; 379/96, 265, 114; 705/38, 40, 412, 14
See application file for complete search history.

(56) References Cited

U.S. PATENT DOCUMENTS

| 5,537,470 | A | * | 7/1996 | Lee | 379/265.11 |
|---|---|---|---|---|---|
| 5,577,100 | A | * | 11/1996 | McGregor et al. | 455/406 |
| 6,463,149 | B1 | * | 10/2002 | Jolissaint et al. | 379/265.09 |
| 6,493,437 | B1 | * | 12/2002 | Olshansky | 379/114.13 |
| 6,865,540 | B1 | * | 3/2005 | Faber et al. | 705/8 |
| 7,139,728 | B2 | * | 11/2006 | Rigole | 705/26 |
| 7,289,612 | B2 | * | 10/2007 | Lurie et al. | 379/114.1 |
| 7,289,623 | B2 | * | 10/2007 | Lurie | 379/221.02 |
| 7,296,003 | B2 | * | 11/2007 | Mersky et al. | 705/75 |
| 7,308,422 | B1 | * | 12/2007 | Faber et al. | 705/26 |
| 7,403,947 | B2 | * | 7/2008 | Lund | 707/10 |
| 7,412,412 | B2 | * | 8/2008 | Buxton et al. | 705/35 |
| 7,418,429 | B1 | * | 8/2008 | Mok et al. | 705/67 |
| 7,483,856 | B2 | * | 1/2009 | Likourezos et al. | 705/39 |
| 7,516,153 | B2 | * | 4/2009 | Hackworth et al. | 707/102 |
| 2001/0049638 | A1 | * | 12/2001 | Satoh | 705/26 |
| 2002/0002512 | A1 | * | 1/2002 | Harpale | 705/26 |
| 2002/0016779 | A1 | * | 2/2002 | Roll et al. | 705/400 |
| 2002/0023000 | A1 | * | 2/2002 | Bollay | 705/14 |
| 2002/0087340 | A1 | * | 7/2002 | Boubez et al. | 705/1 |
| 2002/0087344 | A1 | * | 7/2002 | Billings et al. | 705/1 |
| 2002/0099654 | A1 | * | 7/2002 | Nair | 705/40 |
| 2002/0103673 | A1 | * | 8/2002 | Atwood | 705/2 |
| 2002/0103693 | A1 | * | 8/2002 | Bayer et al. | 705/10 |
| 2002/0111907 | A1 | * | 8/2002 | Ling | 705/41 |
| 2003/0041029 | A1 | * | 2/2003 | Gould | 705/50 |
| 2003/0115089 | A1 | * | 6/2003 | Lurie | 705/8 |
| 2003/0126205 | A1 | * | 7/2003 | Lurie | 709/204 |
| 2003/0154097 | A1 | * | 8/2003 | Hartley et al. | 705/1 |
| 2003/0208560 | A1 | * | 11/2003 | Inoue et al. | 709/219 |
| 2004/0122941 | A1 | * | 6/2004 | Creamer et al. | 709/224 |

(Continued)

OTHER PUBLICATIONS

U.S. Appl. No. 60/564,781 for USPAT 7,516,153 Margiloff et al.*

*Primary Examiner* — John Follansbee
*Assistant Examiner* — Anthony Mejia
(74) *Attorney, Agent, or Firm* — White-Welker & Welker, LLC; Matthew T. Welker, Esq.

(57) ABSTRACT

The present invention provides techniques for managing, supporting and empowering Independent Agents to offer a method for enabling expert Service Providers to deliver, and charge for, advice to consumers, by connecting two parties in real time. The present invention also provides the method and techniques for expert Service Providers, in turn, to provide their service through a multiplicity of Independent Agent channels without the potential for communication device conflict; thereby ensuring successful connections for consumers.

20 Claims, 17 Drawing Sheets

U.S. PATENT DOCUMENTS

| | | | |
|---|---|---|---|
| 2004/0199412 A1* | 10/2004 | McCauley | 705/7 |
| 2004/0210536 A1* | 10/2004 | Gudelj et al. | 705/64 |
| 2004/0252820 A1* | 12/2004 | Faber et al. | 379/201.12 |
| 2005/0027594 A1* | 2/2005 | Yasnovsky et al. | 705/14 |
| 2005/0086290 A1* | 4/2005 | Joyce et al. | 709/202 |
| 2005/0216287 A1* | 9/2005 | Crosby et al. | 705/1 |
| 2005/0216335 A1* | 9/2005 | Fikes et al. | 705/14 |
| 2006/0004713 A1* | 1/2006 | Korte et al. | 707/3 |
| 2006/0168144 A1* | 7/2006 | Segan et al. | 709/219 |
| 2007/0168218 A1* | 7/2007 | Harrison, Jr. | 705/1 |
| 2009/0094137 A1* | 4/2009 | Toppenberg et al. | 705/27 |
| 2009/0125395 A1* | 5/2009 | Coleman | 705/14 |

\* cited by examiner

Choose a category

Business
Accounting : Career : Consulting : Finance : Legal : Tax : Other

Technical
ASP Programming : PHP Programming : Visual Basic : Java Programming : Hardware : Internet : Multimedia : Networking : Software : Windows : Other : Support Help Desk

Personal
Coaching : Education : Finance : Health & Fitness : Legal : Tax : Other

Metaphysical
Astrology/Horoscope : Numerology : Psychics : Tarot Reading : Other

Figure 3a

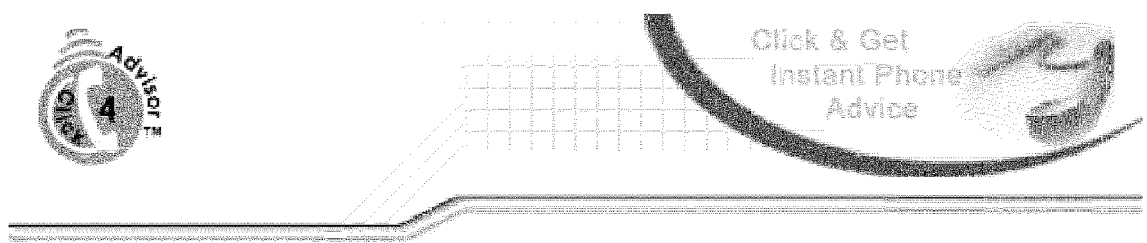
You will receive a call right now.
Time left for this call is 48 minutes
Click Here to Make a Deposit*
* Your deposit will be credited toward future calls, but not to this current call.
service by:    powered by: 
Figure 3e

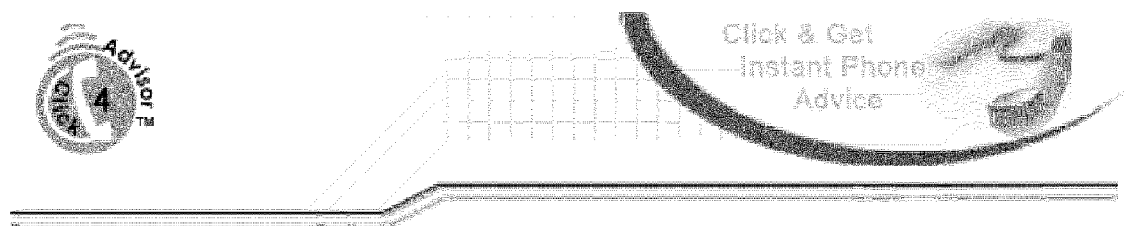

Advisor: dnl28
Rate Per Minute: $0.99  Dial-In Id: 10119
Advisor Profile/Feedback    Email to Advisor
Your phone number is NEVER disclosed to anyone. Privacy Statement If you are not a registered user, click here to signup for services.    How does it work?

User Id [rg5]    Password [ ]
Country [(+1) USA ▼]
Your Number [925] - [469] - [9600]  Ext. [202]

[Call on Phone]

The advisor is on call. Please call back later or send an email to schedule a call.

service by: Click4Advisor™     powered by: zilltalk

Figure 3f

Click4Advisor – Advisor Not Available

Click4Advisor Member Web Interface

Logged as: rg5  Logout

| Usage Transactions | Deposit Transactions | Messages | User Profile | Help |

Usage Information | Make Deposit

Usage Information

The current balance is $49.62

| From | | | To | | | Feedback | Advisor Payout Id |
|---|---|---|---|---|---|---|---|
| 1 | Dec | 2003 | 30 | Jul | 2004 | All | All |

Search

Usage Information for December 01, 2003 – July 30, 2004   [ Download as .csv file ]

| Id | Date/Time | Advisor Name | Service Description | Call Duration | Amount Charged | Advisor Payout Id | Status | Feedback | Details |
|---|---|---|---|---|---|---|---|---|---|
| 242 | July 28, 2004 08:23PM | rg2 | Expert in Desktop Programming | 1 | $1.00 | | Completed | Waiting | More... |
| 241 | July 28, 2004 08:15PM | rg2 | Expert in Desktop Programming | 2 | $2.00 | | Completed | Waiting | More... |
| 240 | July 28, 2004 08:00PM | rg2 | Expert in Desktop Programming | 2 | $2.00 | | Completed | Waiting | More... |
| 226 | July 28, 2004 03:44PM | rg2 | Expert in Desktop Programming | 1 | $0.00 | | Completed | Waiting | More... |
| 223 | July 28, 2004 02:31PM | rg2 | Expert in Desktop Programming | 1 | $1.05 | | Completed | Waiting | More... |
| 222 | July 28, 2004 02:00PM | rg2 | Expert in Desktop Programming | 2 | $2.10 | | Completed | Waiting | More... |

Figure 7

Usage Information

The current bal

From: 10 Sep 2004  To: 10 Sep 2004  Advisor Payout Id: All  Advisor: All  User: All  [Search]

Usage Information for September 10, 2004 - September 10, 2004 [Download as .csv file]

| Id | Date/Time | Advisor Name | Service Description | Charged Minutes | Promo Minutes | Total Revenue | Net Earned Amount | Advisor Payout Id | User Name | Status | Service Fee(s) |
|---|---|---|---|---|---|---|---|---|---|---|---|
| 3072 | September 10, 2004 09:04AM | SHARIMA | Medium | 15 | | 29.85 | $23.84 | | redleaf:12 | Completed | Details |
| 3169 | September 10, 2004 09:03AM | Morgaine La Fey | Spiritual clairvoyant guidance counselor. | 15 | | 29.85 | $23.84 | | redleaf:12 | Completed | Details |
| 3067 | September 10, 2004 08:45AM | DEANNA | Psychic / Clairvoyant | 15 | | 29.85 | $23.84 | | redleaf:12 | Completed | Details |
| 3065 | September 10, 2004 08:37AM | MARILYN | I am a very gifted psychic and Tarot reader. | 38 | | 75.62 | $60.40 | | vixenwytch | Completed | Details |
| 3064 | September 10, 2004 08:34AM | DEANNA | Psychic / Clairvoyant | 15 | | 29.85 | $23.84 | | redleaf:12 | Completed | Details |
| 3062 | September 10, 2004 08:05AM | Morgaine La Fey | Spiritual clairvoyant guidance counselor. | 0 | 2 | 0.00 | $0.00 | | patty66 | Completed | Details |
| 3061 | September 10, 2004 08:04AM | DEANNA | Psychic / Clairvoyant | 15 | | 29.85 | $23.84 | | redleaf:12 | Completed | Details |
| 3060 | September 10, 2004 07:46AM | Morgaine La Fey | Spiritual clairvoyant guidance counselor. | 14 | | 27.86 | $22.25 | | Texy | Completed | Details |
| 3057 | September 10, 2004 03:03AM | Morgaine La Fey | Spiritual clairvoyant guidance counselor. | 0 | 3 | 0.00 | $0.00 | | buglady7450 | Completed | Details |

Total Charged Minutes: 127  Total Charges: $252.73  Total Earned: $201.85  Total Promo Minutes: 5

Page 1 of 1

Figure 9

Payout Transactions

From: 1 Dec 2003   To: 10 Sep 2004   Advisor: All   Agent: A   [Search]

Payout Summary for December 01, 2003 - September 10, 2004   Download as .xls file

| Date/Time | Payout Id | Advisor/Agent | Description | Payout Method | Paid To | Amount | |
|---|---|---|---|---|---|---|---|
| September 10, 2004 03:08AM | 301 | OTTO | Agent Services Payout | Direct Deposit | 00000 | $1000.00 | V |
| December 1, 2004 03:20AM | 280 | TAMMAY | Paid to Group Leader | Leader | c30123 | $30.20 | V |
| September 10, 2004 03:20AM | 279 | Willow | Paid to Group Leader | Leader | c30123 | $552.04 | V |
| September 10, 2004 03:19AM | 278 | TRINITY | Paid to Group Leader | Leader | c30123 | $0.00 | V |
| September 10, 2004 03:19AM | 277 | rebe | Paid to Group Leader | Leader | c30123 | $246.37 | V |
| September 10, 2004 03:18AM | 276 | THE GRAND S ABLOT | Paid to Group Leader | Leader | c30123 | $100.75 | V |
| September 1, 2004 03:16AM | 275 | SPIRIT OF LIGHT | Paid to Group Leader | Leader | c30123 | $0.00 | V |
| September 10, 2004 03:16AM | 274 | SISTER DIVINE | Paid to Group Leader | Leader | c30123 | $103.82 | V |
| September 1, 2004 03:16AM | 273 | SHOHMA | Paid to Group Leader | Leader | c30123 | $19.07 | V |
| September 1, 2004 03:15AM | 272 | SERENA | Paid to Group Leader | Leader | c30123 | $1904.22 | V |

Page 1 of 10   [>] [>]

Figure 10

Advisors Availability

These Advisors are ready to speak to you Now:

| Advisor Name | Dial-In Id | Connect |
|---|---|---|
| Angels Intuition | 10189 | Call Now |
| AngelsIntuition | 11540 | Call Now |
| CarolAnn | 10164 | Call Now |
| ChellesGifts | 11343 | Call Now |
| CrystalVisions | 10554 | Call Now |
| EarthAngel | 10132 | Call Now |
| Elizabeths Enchanted Visions | 10336 | Call Now |
| Fairie of Light | 10341 | Call Now |
| GIFTED JEWEL | 10125 | Call Now |
| Jaquine | 11411 | Call Now |
| KarenLustrup | 10384 | Call Now |
| Katsangeleyes | 10124 | Call Now |
| KimiDreams | 11145 | Call Now |
| LoraLukather-Kitch | 10187 | Call Now |
| Marguerite | 10377 | Call Now |
| PsychicRhieanna | 10413 | Call Now |
| PumpkinsnClouds | 10417 | Call Now |
| Schmoopi | 10169 | Call Now |

The following Advisors are on call with other Users:

| Advisor Name | Dial-In Id | Connect |
|---|---|---|
| ChakraHarmony | 11351 | Send Email |

The following Advisors are Un-Available:

| Advisor Name | Dial-In Id | Connect |
|---|---|---|
| AngelDust36 | 10412 | Send Email |

FIGURE 11

SYSTEM AND METHOD FOR EXPERT SERVICE PROVIDERS TO PROVIDE ADVICE SERVICES THROUGH UNIQUE, EMPOWERED INDEPENDENT AGENTS TO CONSUMERS

BACKGROUND OF INVENTION

1. Field of the Invention

The present invention relates to techniques for managing, supporting and empowering Independent Agents to offer a method for enabling expert Service Providers to deliver, and charge for, advice to consumers, by connecting two parties in real time. Further, the present invention provides the method and techniques for expert Service Providers, in turn, to provide their service through a multiplicity of Independent Agent channels without potential communication device conflict for consumers.

2. Description of Prior Art

Advice services are currently offered through a variety of methods and techniques utilizing the telephone and/or the Internet. A consumer seeking advice on any number of various topics can search in a telephone book's yellow pages, for example, and make a basic telephone call. But advice service providers are not able to effectively or efficiently charge time-based fees for their service in this model, nor are consumers guaranteed that the service provider will be available. Further, Internet searching is steadily replacing traditional yellow pages searches by consumers.

1-900 phone systems do enable service providers to charge for their services on a time-elapsed model. However, 1-900 systems also are not able to take advantage of the massive trend of consumers increasingly using the Internet to search for what they want and need, including advice on various topics. Further, single 1-900 numbers have restricted scope and flexibility with regard to service and price, as well as limited consumer trust with regards to billing and quality of service provided.

Currently, there are systems available that facilitate the delivery of advice to consumers in real-time via the Internet utilizing telecommunications systems. However, such systems have created such a massive directory with thousands upon thousands of individual listings in any given category that it has become overwhelming for consumers to determine their choice. Likewise, it has become near impossible for the large majority of individual service providers to attract any interested consumers, as the rigid nature of the directory listing system allows extremely limited opportunities for a particular service provider to differentiate their service among the thousands of others in the same list.

Consequently, there is a need for a system to enable the provision of advice service through both the Internet and telecommunications that can overcome all of the limitations described above. Such a system, which empowers and utilizes independent Agents within its inventive framework and creative methods, is hereinafter described.

SUMMARY

It is the objective of the current invention to provide a system and methods for managing, supporting and empowering independent Agents to offer a unique platform around a standard apparatus for enabling expert Service Providers to deliver, and charge for, advice to consumers, by connecting two parties in real time. The present invention remedies the shortcomings of the prior art by enabling group Agents to integrate the system into their own specialized websites, thereby allowing a much greater expression of differentiation for Service Providers and more focused, comprehensible listings for consumers.

The present invention provides the method and techniques to empower expert Service Providers, in turn, to provide their service through an unlimited number of independent Agent channels without potential communication device conflict, thereby maintaining both service provider and consumer satisfaction.

The benefits of this invention include the facilitation of real-time communication between a Consumer and Service Provider of advice, the management of the accounting system for Consumer, Agent and Service Provider, the empowerment of Agents to develop their own customized website that integrates and utilizes the system thereby offering Consumers more focused and differentiated choice online, and the ability for Service Providers to offer their expert services via multiple accounts to numerous independent Agents by eliminating any potential for telecommunication device conflict. In general, the system provides a more efficient, practical, and functional method to enable Users to contact Service Providers for expert advice and Service Providers to promote and offer their services to and transact their services with consumers than the current art.

Definitions:

Agent: one who integrates and employs the System within their websites or other Internet-based displayed and/or published materials offering a unique, differentiated grouping of Service Providers who collectively employ the System.

Browser: a software program that runs on a client host and is used to request Web pages and other data from server hosts. This data can be downloaded to the client's disk or displayed on the screen by the browser.

Client host: a computer that requests Web pages from server hosts, and generally communicates through a browser program.

Content provider: a person responsible for providing the information that makes up a collection of Web pages.

Embedded client software programs: software programs that comprise part of a Web site and that get downloaded into, and executed by, the browser.

Host: a computer that is connected to a network such as the Internet. Every host has a hostname (e.g., mypc.mycompany.com) and a numeric IP address (e.g., 123.104.35.12).

HTML (HyperText Markup Language): the language used to author Web Pages. In its raw form, HTML looks like normal text, interspersed with formatting commands. A browser's primary function is to read and render HTML.

HTTP (HyperText Transfer Protocol): protocol used between a browser and a Web server to exchange Web pages and other data over the Internet.

HyperText: text annotated with links to other Web pages (e.g., HTML).

Internet-Based Icon: a graphical or text icon that is linked to this system's database and enables the initiation of contact between the Service Provider and the consumer, which is located anywhere throughout the Internet including but not limited to websites, emails, directory listings, and advertisement banners IP (Internet Protocol): the communication protocol governing the Internet.

Server host: a computer on the Internet that hands out Web pages through a Web server program.

Service Provider: one who is providing advice through this system to Users or consumers. Also known as an Expert or an Advisor.

URL (Uniform Resource Locator): the address of a Web component or other data. The URL identifies the protocol used to communicate with the server host, the IP address of the server host, and the location of the requested data on the server host. For example, "http://www.lucent.com/work.html" specifies an HTTP connection with the server host www.lucent.com, from which is requested the Web page (HTML file) work.html.

User: one who is seeking advice services from expert Service Providers through this system. Also known as a Consumer or Customer.

UWU server: in connection with the present invention, a special Web server in charge of distributing statistics describing Web traffic.

Visit: a series of requests to a fixed Web server by a single person (through a browser), occurring contiguously in time.

Web master: the (typically technically trained) person in charge of keeping a host server and Web server program running.

Web page: multimedia information on a Web site. A Web page is typically an HTML document comprising other Web components, such as images.

Web server: a software program running on a server host, for handing out Web pages.

Web site: a collection of Web pages residing on one or multiple server hosts and accessible through the same hostname (such as, for example, www.lucent.com).

BRIEF DESCRIPTION OF DRAWINGS

Without restricting the full scope of this invention, the preferred form of this invention is illustrated in the following drawings:

FIG. 3a displays the different categories of Service Providers;

FIG. 3e shows a popup displaying the call-time time clock;

FIG. 3f displays a popup displaying a busy message;

FIG. 7 displays Users' usage information

FIG. 9 displays a summary page associated with an Agent; and

FIG. 10 displays an accounting summary screen.

FIG. 11 displays an Agent-specific availability quick-list popup window.

DETAILED DESCRIPTION

The following description is demonstrative in nature and is not intended to limit the scope of the invention or its application of uses.

There are a number of significant design features and improvements incorporated within the invention.

The current invention is a system that will allow Users to contact Service Providers in specific fields. The Users will choose a Service Provider to contact. Once a Service Provider is chosen, a pop-up window will appear telling that User, among other things, if the Service Provider is available or not. If the Service Provider is available the system will connect the User with the Service Provider. The system provides techniques for managing, supporting and empowering Independent Agents to offer a method for enabling expert Service Providers to deliver, and charge for, advice to consumers, by connecting two parties in real time. Further, the present invention provides the method and techniques for expert Service Providers, in turn, to provide their service through a multiplicity of Independent Agent channels without potential communication device conflict for consumers.

The computer application that includes the User interface for this invention will henceforth be referred to as "the System 1." The system is network based and works on an Internet, Intranet and/or Wireless network.

Figure 1:
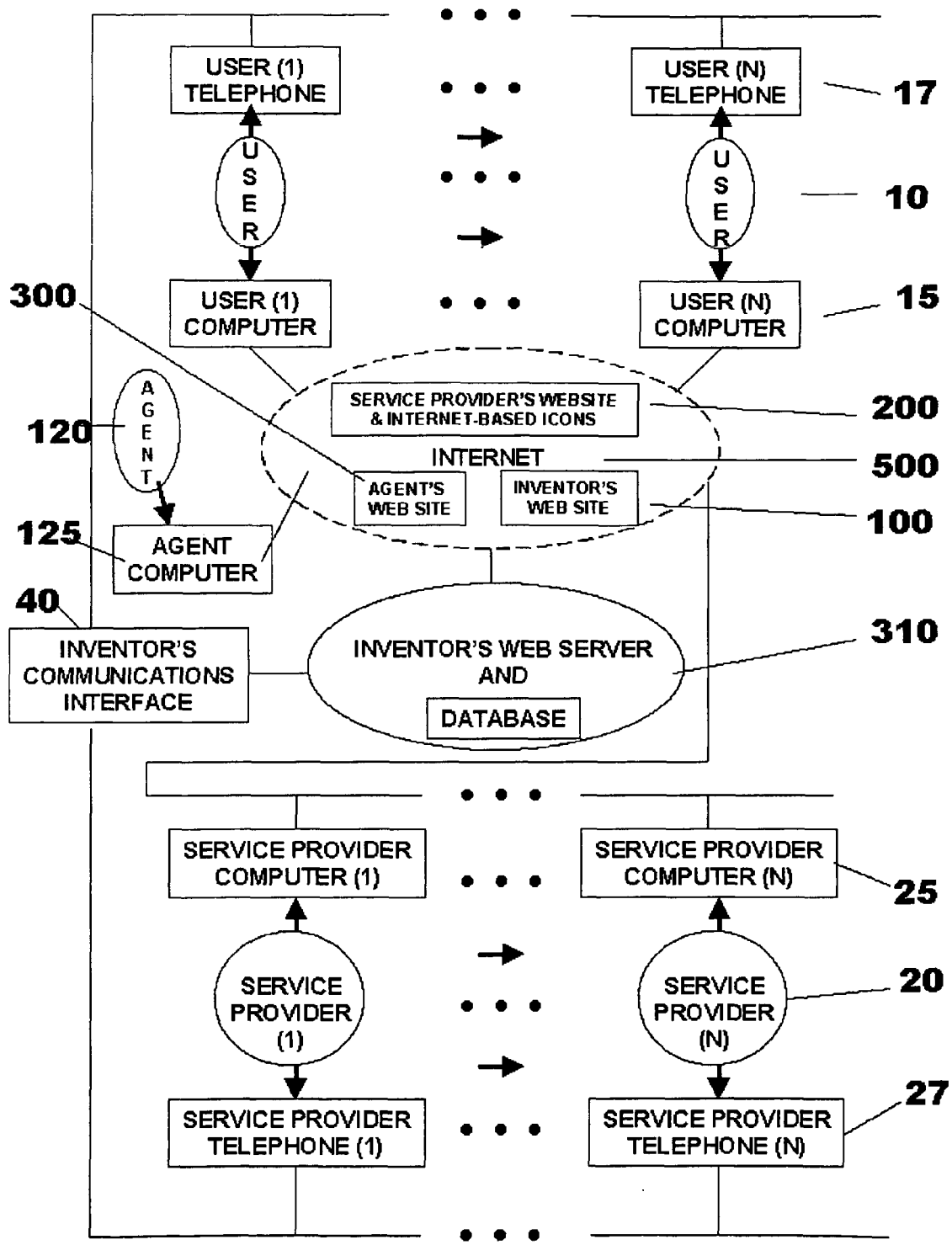
FIG. 1 shows an overview of how a User accesses the system through the Internet.

FIG. 1 illustrates a functional diagram of a computer network for World Wide Web 500 access to the System 1 from a plurality of Users 10 who access the System Web Server and Database 310 via the System Web Site 100, independent Agent 300 integrator Websites, and/or a plurality of Service Provider Websites and Internet-based Icons 200 from the Users' Computers 15 and Telephones 17. Accessing the System Web Site 100, the Agent Websites 300, or the Service Provider Websites and Internet-based Icons 200 can be accomplished directly through a communication means such as a direct connection, an intranet, a local Internet Service Provider, often referred to as ISPs, or through an on-line Service Provider like COMPUSERVE, PRODIGY, AMERICA ONLINE, etc. or Wireless devices using services like AT&T or VERIZON.

The Users 10 contact the System Web Server and Database 310 via the System Web Site 100, the Agent Website 300 or the Service Provider Websites and Internet-base Icons 200 using an informational processing system (Client) capable of running an HTML compliant Web browser such as MICROSOFT'S INTERNET EXPLORER, NETSCAPE NAVIGATOR and MOSAIC. A typical system that is used is a personal computer with an operating system such as LINUX or WINDOWS 95, 98 or ME, NT, or 2000, running a Web browser. The exact hardware configuration of computer used by the Users 10, the brand of operating system or the brand of Web browser configuration is unimportant to understand this present invention. Those skilled in the art can conclude that any HTML (Hyper Text Markup Language) compatible Web browser is within the true spirit of this invention and the scope of the claims.

In one preferred embodiment of the invention, the Users 10, Agents 120 and Service Providers 20 can connect to the System Web Site 100 via the Internet 500 using their respective Computers 15, 125 and 25 to register their accounts. In the preferred embodiment the system has numerous web pages. The information in the web pages is in HTML format via the HyperText Transport Protocol (http) and on Server System 310. The User System 310 allows the viewing of web pages and the inputting of User 10, Agent 120 and Service Provider 20 information to be stored in the System Database 310, through commonly used software referred to as a Web Browser, such as Communicator available from Netscape Communications Corp. or Internet Explorer available from Microsoft Corp. The system is capable of accessing web pages located on Server System 310.

The System 310 provides the ability to allow Agents 120 and Service Providers 20 to embed Internet-based Icons within their websites, emails and online advertising banners, 300 and 200, that are empowered to access the System Web Server Database 310. From these websites and Internet-Based Icons, 300 and 200, Users 10 are enabled to contact the Agents' Service Providers or independent Service Providers 20.

The System 1 will connect the User 10 and the Service Provider 20 using a communication interface 40. In the preferred embodiment, once a User 10 decides on a Service Provider 20, the communication interface 40 will call both the User 10 and the Service Provider 20 to connect them so that the Service Provider 20 can assist the User 10. The communication interface 40 will call the User's telephone 17 and the Service Provider's telephone 27. This communication can also be done over the Internet or an instant messenger system.

Figure 2:
FIG. 2 shows the system main web page.

In one preferred embodiment of the invention, the Users 10 connect to the Web site 100. The system 1 would have a standard home web page as shown in FIG. 2. This home web page would have information about the system 1. The main web page in the preferred embodiment would also have an icon that a User 10 would click for a demonstration of the system 1 as well as hypertexts to help and information web pages. The main web page would also include icons that would transfer a User 10 to User Information, Advisor Information, Agent Information, User Registration, Advisor Registration, About Us, News and Contact Us web pages. The home web page would also have hypertext to the standard home, legal notices, copyright notices, Privacy Policy, User Agreement, Advisor Agreement and Contact Us web pages.

Figure 3B:
FIG. 3b shows the listing of Service Providers.

In the preferred embodiment of the System 1, an Agent 120 of the System 1 will provide an industry-specific Internet-based Agent directory website 300, like the example in FIG. 3b, whereat a User 10 can locate and choose from multiple Service Providers 20. If User 10 chooses to use a specific Service Provider he/she will use the curser to click the connect icon.

Figure 3C:
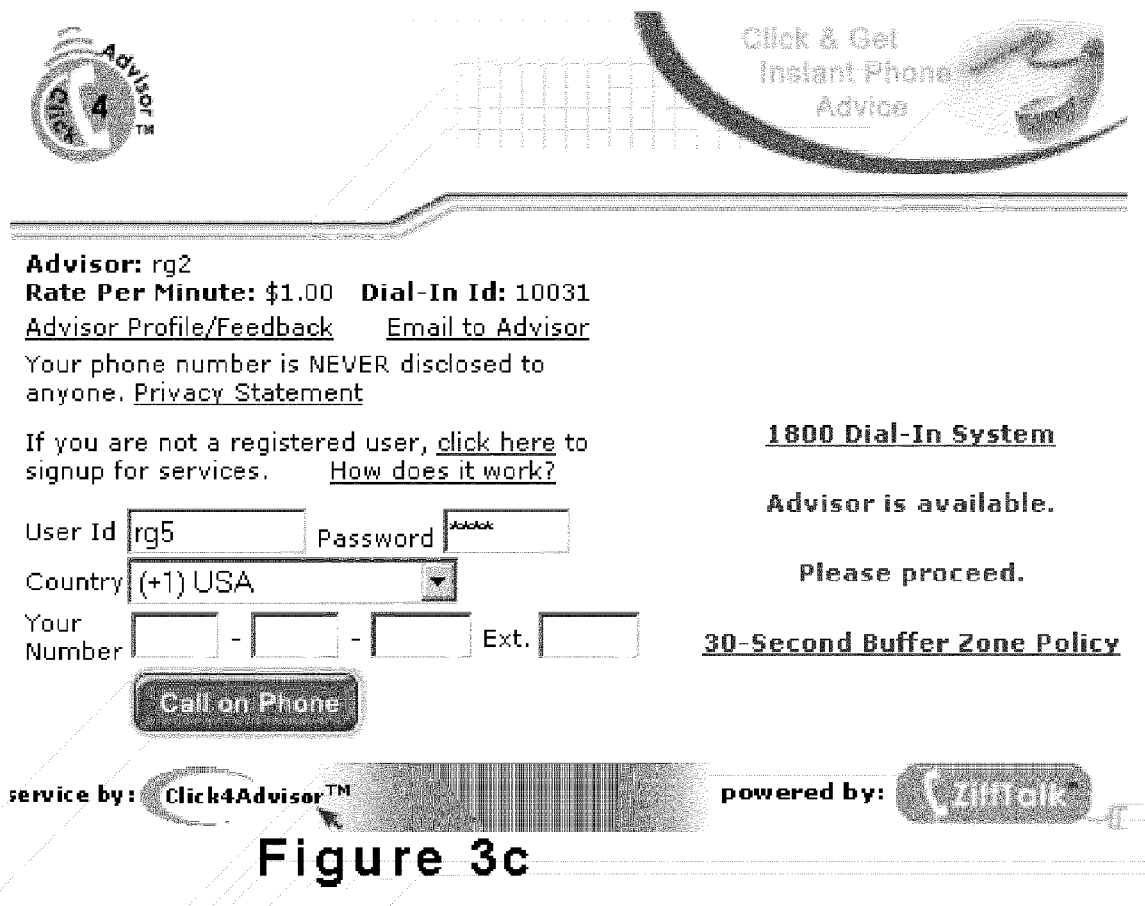
FIG. 3c displays a popup displaying the Service Provider's information.

The connect icon will bring up a popup window as shown in FIG. 3c. This popup window will display the Service Provider's system ID name, their rate of compensation, a hypertext link to a summary about the Service Provider that includes feedback from previous Users, various other hypertext links to policies, new User Registration, and descriptions of how the System 1 works, as well as text boxes for Users 10 to enter their System ID and Password and telephone number, and whether or not the Service Provider is available. If available, the User 10 fills in his telephone number and clicks the Call on Phone icon. The system will then contact the User 10 and the Service Providers through the phone lines connecting the two together.

The system 1 will also allow the User 10 to click on hypertext link in an Agent's web property 300 and view a quick list to check the availability status of all the Agent's 120 Service Providers 20. FIG. 11 is a sample of this Agent-specific availability quick-list.

Figure 3D:
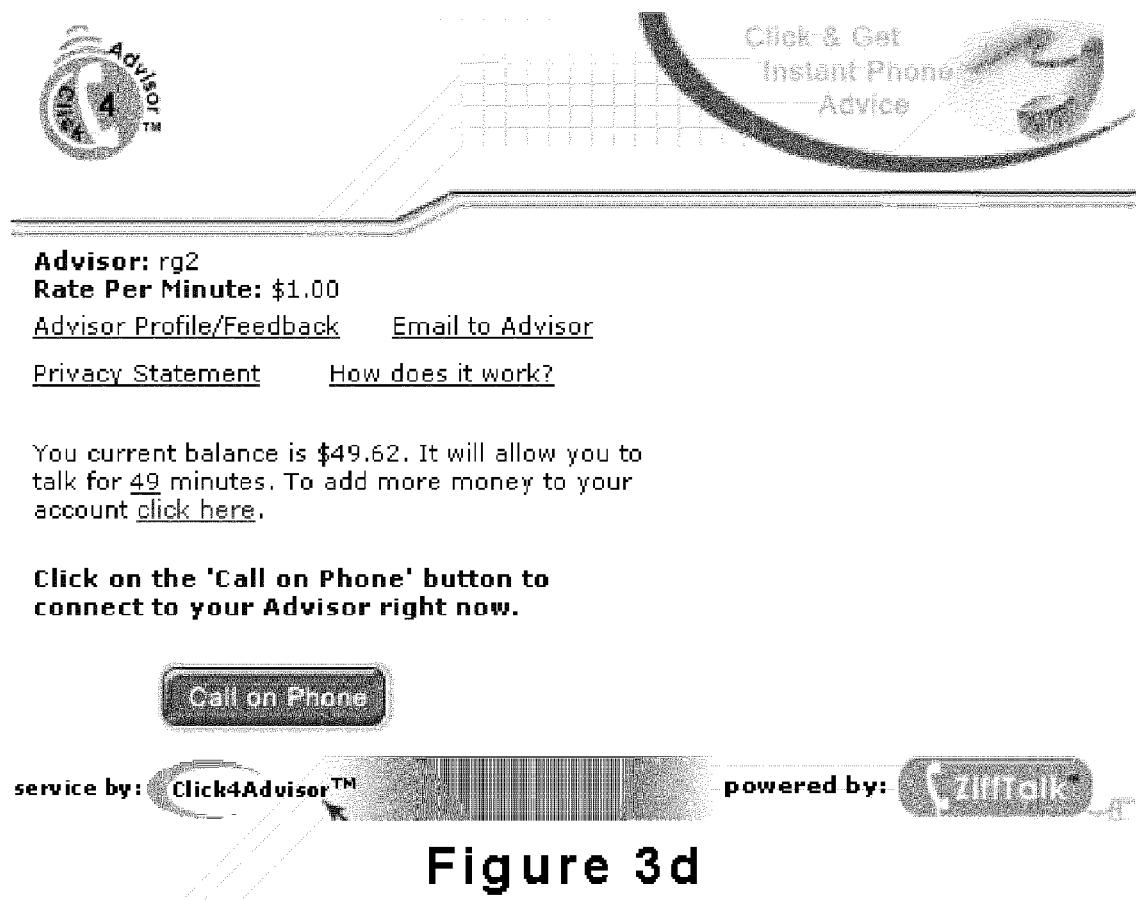
FIG. 3d displays a popup displaying a User's allotted call-time.
Figure 4:
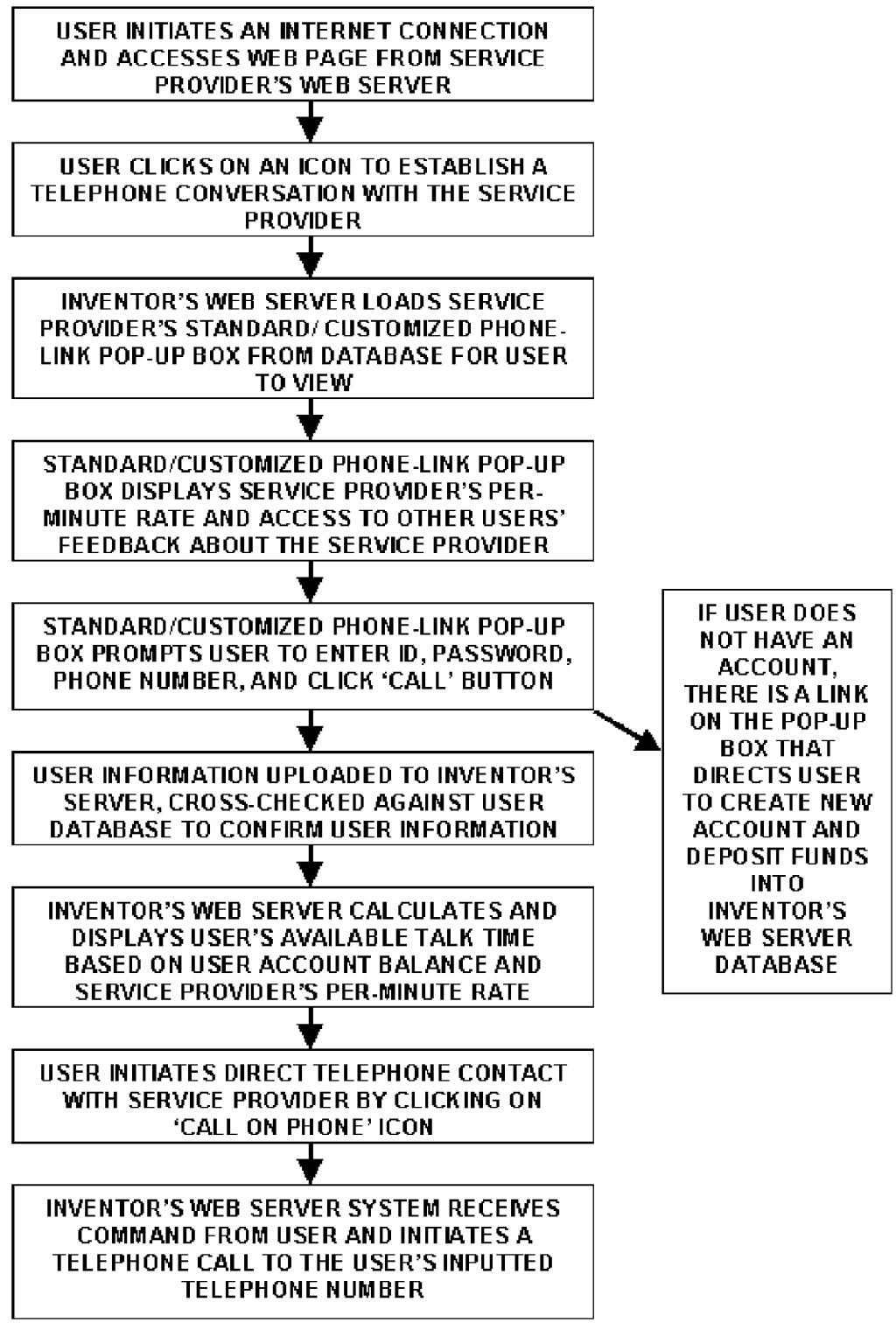
FIGS. 4 and 5 show the flowchart if a Service Provider is available.
Figure 5:
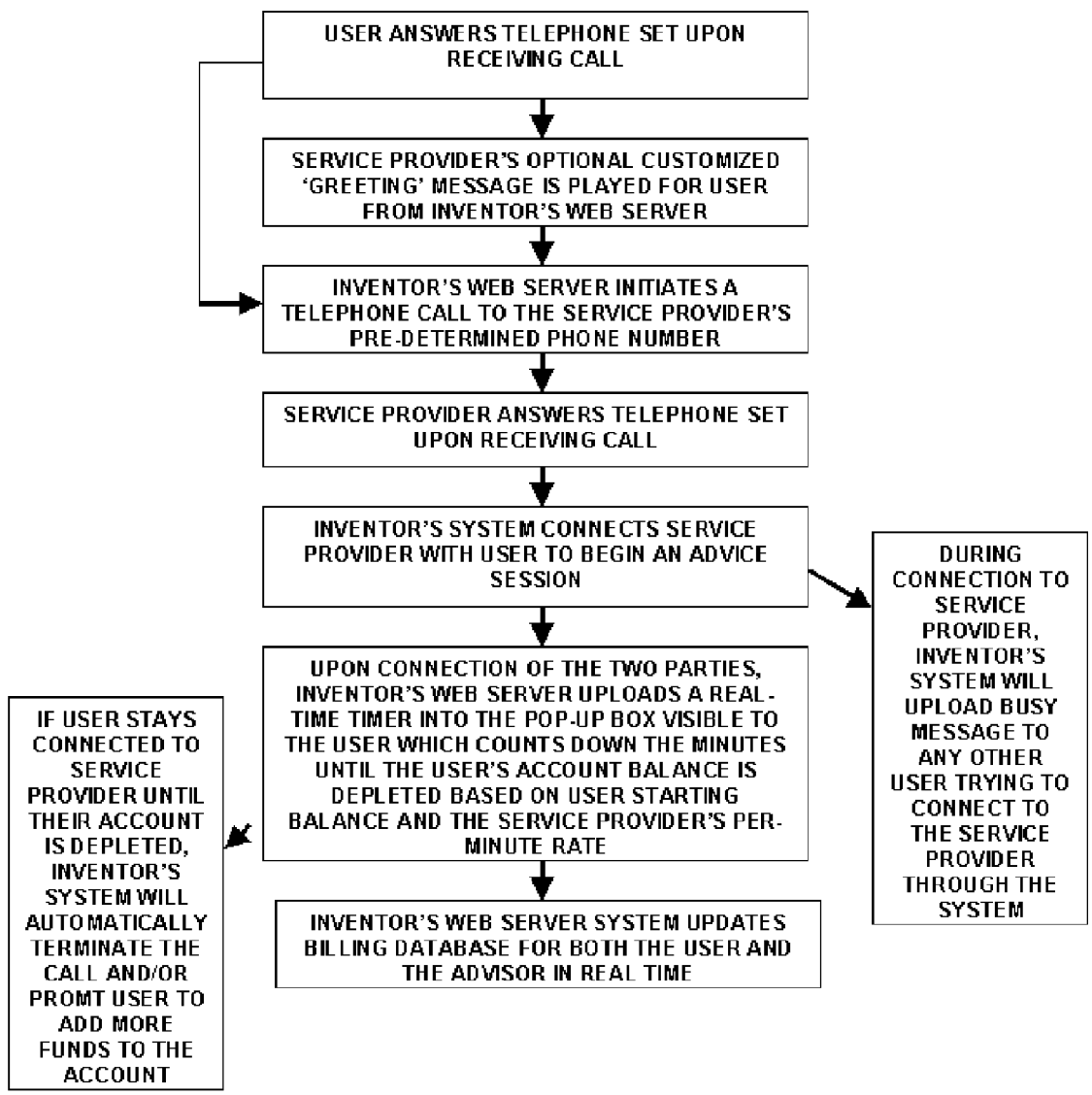

FIGS. 4 and 5 displays a system flowchart 2 of what happens if a Service Provider 20 is Available. First the User 10 initiates an Internet connection and accesses the Agent's 300 or an the independent Service Provider's web page or other web presence 200 from a web server. Next the User 10 clicks on an icon to initiate the establishment of a telephone conversation with the Service Provider 20. The system's web server 310 loads Service Provider's standard/customized phone-link pop-up box from system database 310 for the User 10 to view. The standard/customized phone-link pop-up window displays the Service Provider's system name, per-minute rate, availability message and access to system email service and to other Users' feedback about the Service Provider 20. The standard/customized phone-link pop-up window prompts User to enter ID, password, phone number, and click 'call' button. If User 10 does not have an account, there is a link on the pop-up window that directs User 10 to create a new account and deposit funds into the system's web server database 310. The User information is uploaded to the system and crosschecked against the User database to confirm User information. The system's web server 310 then calculates and displays, as shown in FIG. 3d, in the pop-up window the User's available talk time based on User account balance and Service Provider's per-minute rate. The User 10 initiates direct telephone contact with Service Provider 20 by clicking on a 'call on phone' icon. The system's Communications Interface 40 receives command from the User 10 and initiates a telephone call to the User's inputted telephone number. The User 10 answers telephone upon receiving the call The Service Provider's optional customized 'greeting' message is played for User 10 from the system's communications interface 40. The system communications interface 40 then initiates a telephone call to the Service Provider's phone number as registered in the system database 310. The Service Provider 20 answers telephone set upon receiving call. The communications interface 40 connects the Service Provider 20 with User 10 to begin an advice session.

During the connection to the Service Provider 20, the system 1 will upload a busy message into the pop-up window to any other User 10 trying to connect to the Service Provider 20 through the system 1. Furthermore, the system 1 will upload a busy message into the pop-up window to display to any other User 10 trying to connect to all other Service Provider accounts, either associated with other Agent 120 groups or independent, that have assigned their calls to be routed to the same telephone number as to that which is currently busy.

Upon connection of the two parties, the system 1 uploads a real-time timer into the pop-up window, as shown in FIG. 3e, visible to the User 10 which counts down the minutes until the User's account balance is depleted based on User 10 starting balance and the Service Provider's per-minute rate. If the User 10 stays connected to Service Provider 20 until their account is depleted, the system 1 will automatically terminate the call and/or prompt User to add more funds to the account. The system 1 updates the billing database for both the User 10, the Agent 120 and the Service Provider 20 in real time.

Figure 3G:
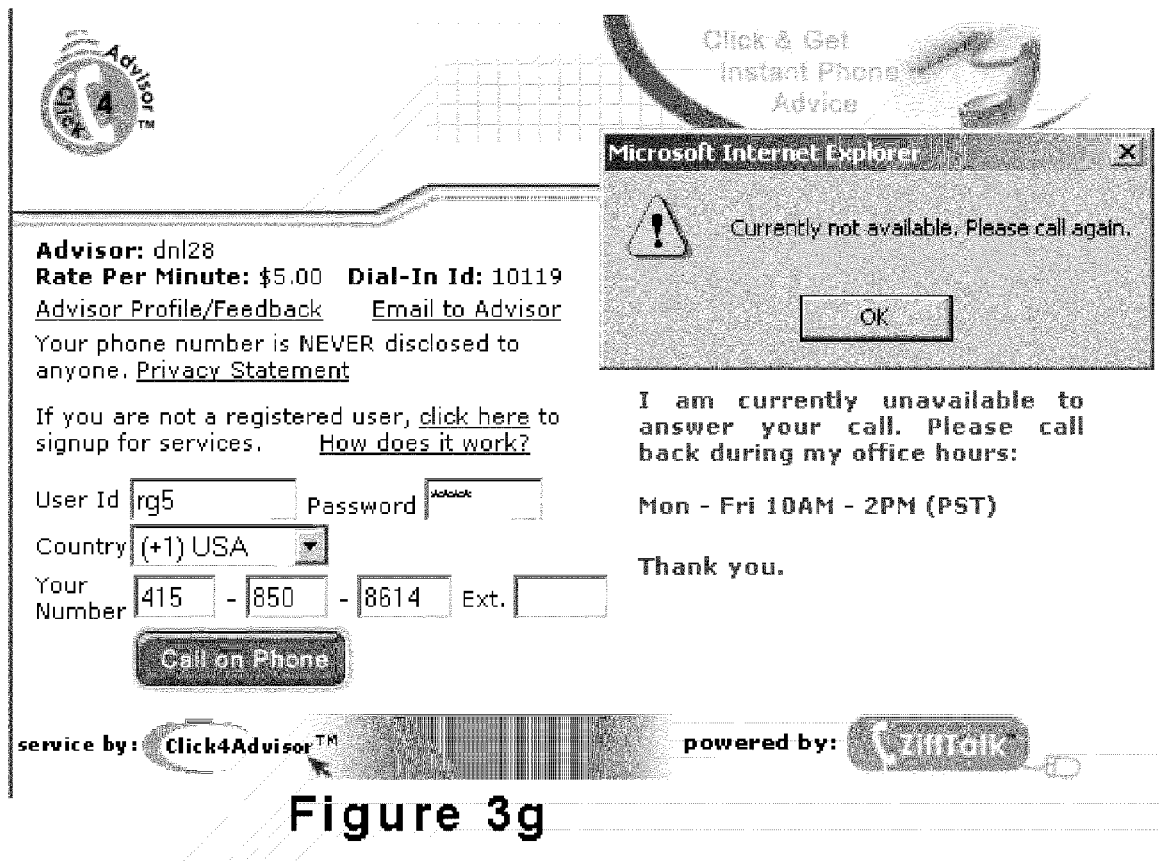
FIG. 3g displays a popup displaying a not available message.
Figure 6:
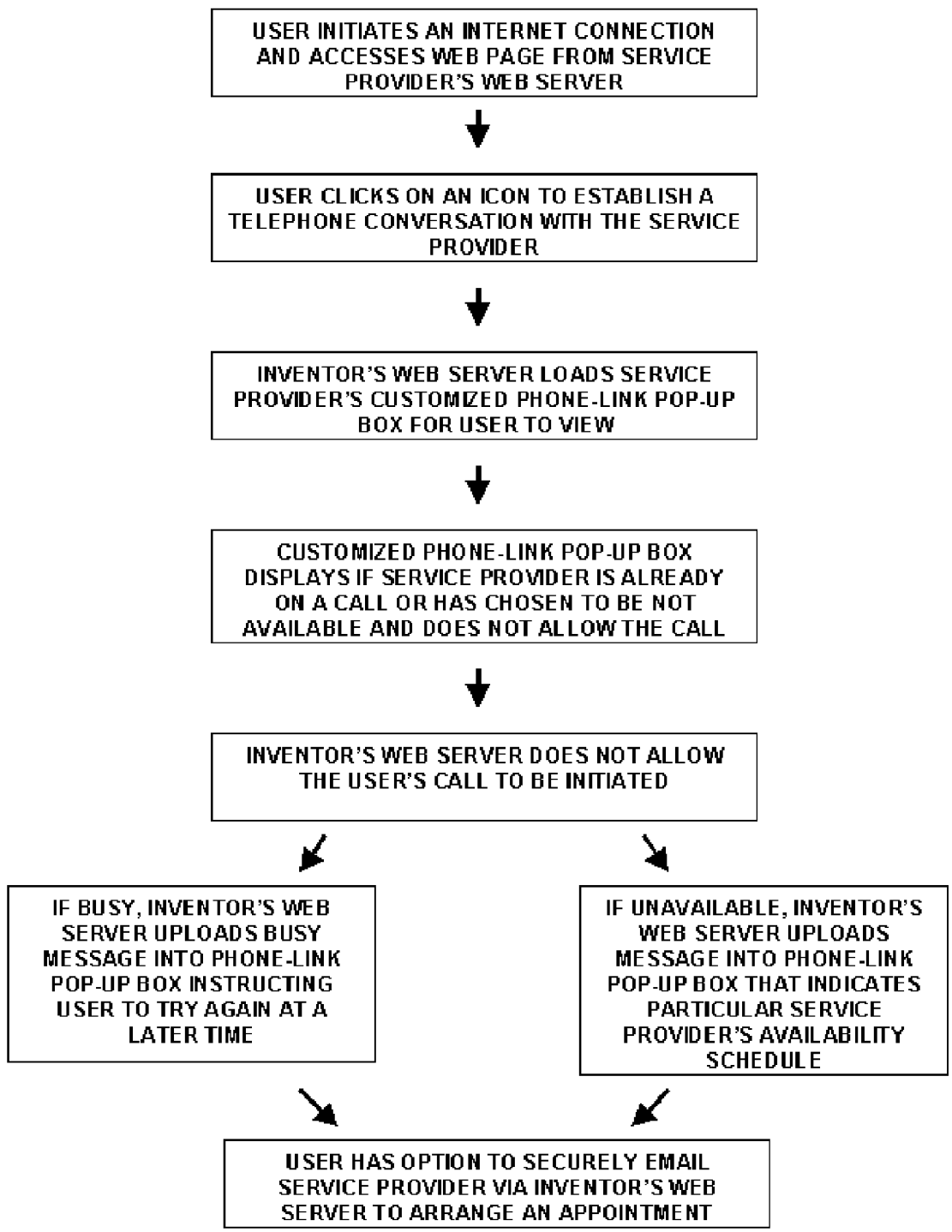
FIG. 6 shows the flowchart if a Service Provider is unavailable.

FIG. 6 displays a system flowchart of how the system 1 processes when a Service Provider 20 is Not Available. First, the User 10 initiates an Internet connection and accesses the Agent's 300 or the Service Provider's web page or other web presence 200 from the a web server. Next, the User 10 clicks on an icon to establish a telephone conversation with the Service Provider 20. The system 1 loads the Service Provider's standard/customized phone-link pop-up window from the system web server database 310 for User 10 to view. The system 1 checks the web server database 310 to determine whether the Service Provider 20 has pre-determined to be Not Available at this time and then with the communication interface 40 to determine if Service Provider 20 is already on a call. If either is the case, the system 1 does not allow the communications interface 40 to initiate the User's intended call. Additionally, the web server 310 generates and displays in the standard/customized phone-link pop-up window that the Service Provider 20 is busy on another call or has chosen to be Not Available at this time. If Busy, the system 1 uploads a standard busy message, as shown in FIG. 3f, into phone-link pop-up window instructing User to try again at a later time. If Not Available, the system 1 uploads a standard or an optional, customized message, an example shown in FIG. 3g, into phone-link pop-up window that can indicate the Service Provider's availability schedule. The User 10 will then have the option to privately and securely email Service Provider 20 via the system 1 to arrange an appointment.

FIG. 7 displays User 10 usage information from within the User management interface. The site 100 will ask for the Users 10 to enter their system name and password to access their account's User management interface. The system 1 will display this information to assist and inform the User 10. The web page will have the date/time, adviser's name and service description, call duration, amount charged, Service Providers' payout ID, the status, feedback and details. This information, along with many other account management functions within the User management interface, is used by the User 10 to manage his or her account. User-initiated deposits from the interface to the account of the User 10 initially and continually fund the account.

The system 1 will also create a feedback system for the Users 10 to reference based on a history of past feedback information on Service Providers 20 by other Users 10. The User 10 will give feedback to the system 1 regarding the Service Provider 20 based on the service provided. The system 1 will prompt a User 10 provide such feedback.

Figure 8:
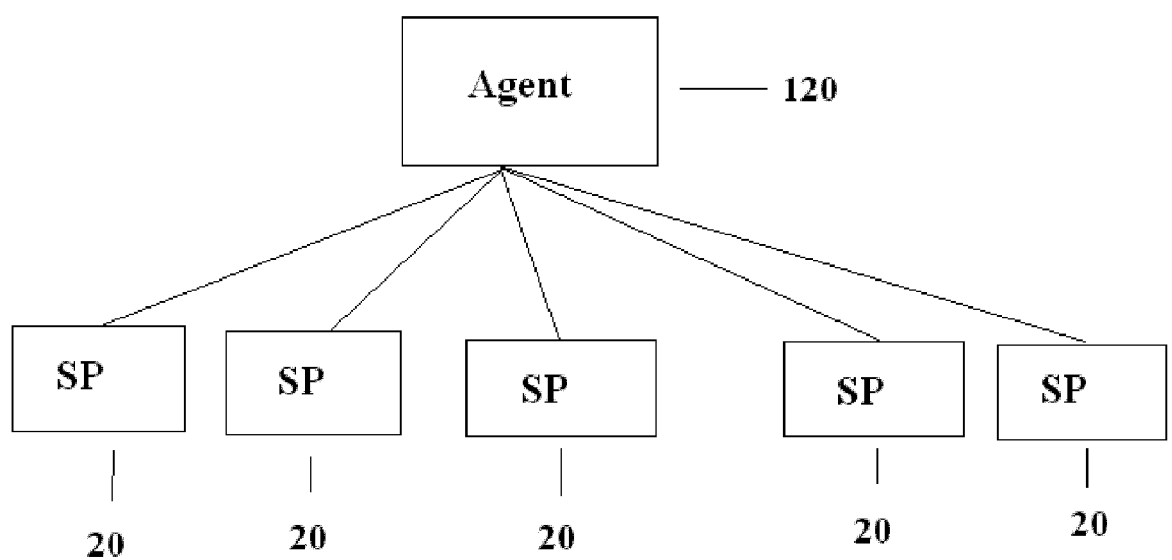
FIG. 8 displays the association of multiple Service Providers with an Agent.

The system 1 will assign an Agent ID number to the Agent 120 account. The expert Service Provider 20 will enter the appropriate Agent ID when registering as a new Service Provider 20 with the particular Agent 120 in order to be displayed on the Agent's web site 300. As shown in FIG. 8, the system 1 will link all Service Providers 20 registered under a single Agent ID 120 into one account information and transaction activity management interface: the Agent management interface. The system 1 will automatically distribute the appropriate service HTML code to the Agent 120 for each newly registered Service Provider 20 thereby; enabling the Agent 120 to readily create their own Internet-based collection 300 of specialized Service Providers 20 and in turn, connect Users 10 with these Service Providers 20 for expert advice in real time via a telephone connection. FIG. 9 displays a sample function of the system's 1 Agent management screen interface: Usage Information. Per FIG. 9, the screen will have a transaction ID, the date and time of the transaction, service description, charged minutes, promo minutes, total revenue per transaction, Net earned amount, advisor payout ID, User name, status of transaction, service fee details and credit to user field that will be displayed. The screen will have selection criteria for the records to display. This criterion includes from and to dates, advisor payout ID, Advisor and User.

The system 1 monitors how long telephonic connections are maintained between said Users 10 and the Service Providers 20. The system 1 will assist Agents 120 who have multiple Service Providers 20 manage their transactions.

The system 1 will help an Agent 120 manage their accounts by offering the Agent 120 the option of automated payroll responsibility or a managed payout consisting of, deducting a pre-determined Agent service fee for each transaction and distributing the Agent fee to the Agent 120. The system 1, in the preferred embodiment, has a payout accounting screen, a sample shown in FIG. 10, that displays the fees paid to the system per Service Provider 20 and a summary for the Agents 120 based on their Service Providers' 20 transaction activity. The sample screen has the following fields: Date/Time, Payout ID, Advisor/Agent description, payout method, Paid to, Amount and Detail. The screen will have a selection criterion for the records to display. This criterion includes from and to dates, advisor payout ID, Advisor and User.

The system 1 will offer a number of payment options. The system 1 can either pay the Service Providers 20 directly for the Agent 120 while also paying the Agent's service fee earnings to the Agent 120, or pay the Agent 120 the entire earned amount for the Agent Group, who in turn will then pay their Service Providers 20. The system 1 can handle all of the accounting and payment processing for the Agent 120 for all or part of their associated Service Providers 20.

The system 1 provides a method and techniques for expert Service Providers 20, in turn, to provide their service through an unlimited number of Independent Agent web-based channels 300 without potential communication device conflict for consumers.

The system 1 will offer recognition, across the entire database of Service Providers' telephone numbers including potentially multiple different accounts associated with multiple different Agent group web sites 300, of whether a particular Service Provider's telephone line is busy. Thereby, enabling a Service Provider 20 to register and be part of numerous different Agent group web sites 300, without concern for any potential telephone connection conflict.

The system 1 will keep track of the amount of time that the User 10 used an Agent's Service Provider 20 and use that time multiplied by the Service Provider's billable rate and the Agent's 120 service fee to calculate the amount due to the Agent 120. The system 1 will manage all of the time and billing records for the Agent 120 and their Service Providers 20. The system 1 will enter this information into a database.

The system 1 is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system 1 is set to run on telecommunications sets. Telecommunications sets can include standard landline telephone sets utilizing the Publicly Switched Telephone Network (PSTN) or any variations thereof, any kind of cellular telephone set utilizing any cellular call processing technology, as well as any telecommunications sets utilizing Voice over Internet Protocol (VoIP) voice communications technology. Telecommunications sets like this are well known in the art and are not pertinent to the invention. The system 1 can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of connecting two parties over a phone in real time executed by a computer, the method comprising:
   providing a computer executing the method;
   registering one or more Service Providers;
   registering one or more Agents;
   having one or more Agents creating an associated selected plurality of one or more Service Providers;
   enabling the one or more Agents to integrate their selected plurality of Service Providers into their own specialized websites for browsing by a User;
   having the User initiate contact with the Service Provider via the Agent's specialized website;
   extracting User real-time account balance information from a System Database;
   extracting Service Provider per minute compensation rate from the System Database;
   dividing the User account balance total by the Service provider per minute compensation rate;
   determining total minutes said User can connect to said Service provider until said User's account balance reaches zero;
   displaying this information to said User textually in pop-up window the moment before said User connects to said Service provider; and
   displaying a graphical timer in said pop-up window, once said User connects to said Service provider, begins counting down the minutes remaining for the User to be connected to the Service provider until said User's account balance is depleted and correspondingly their connection terminated; and
   connecting the User with the Service Provider if the Service Provider is available.

2. The method as described in claim 1, further comprising generating a pop-up window with information about said Service Provider;
   checking to see if the Service Provider is available.

3. The method as described in claim 2, further comprising having said pop-up window prompting said User to enter their phone number to make said connection.

4. The method as described in claim 2, further comprising generating a message for said User in said pop-up window when said Service Provider is not available.

5. The method as described in claim 2, further comprising allowing said Service Provider to enter their hours of availability.

6. The method as described in claim 1, further comprising displaying said Service Provider's hours of availability within a pop-up window.

7. The method as described in claim 1, further comprising denying said connection if a User tries to initiate a connection during the hours said Service Provider is scheduled to be not available.

8. The method as described in claim 1, further comprising displaying in a pop-up window that said Service Provider is currently busy on another call if said Service Provider is currently on another system call.

9. The method as described in claim 1, further comprising having a system manage the transaction records for said Agent's Service Providers.

10. The method as described in claim 9, further including reporting said transaction records.

11. The method as described in claim 9, further comprising calculating the amount due to the Service Provider based on the Service Provider's transactions.

12. The method as described in claim 11, further comprising paying the Service Provider and the Agent the amount due based on the transactions.

13. The method as described in claim 1, further comprising assigning an Agent ID number to an Agent account.

14. The method as described in claim 1, further comprising distributing an appropriate service HTML code to the Agent associated with the Service Provider for each newly registered Service Provider associated to the Agent.

15. A method of connecting two parties over a phone in real time executed by a computer, the method comprising:
   providing a computer executing the method;
   registering one or more Service Providers;
   registering one or more Agents;
   having an Agent account;
   assigning an Agent ID number to said Agent account;
   having a Service Provider enter said Agent ID when registering as a new Advisor;
   linking all Service Providers under a single Agent ID into one account information and transaction activity management interface;
   distributing the appropriate service HTML code to the Agent for each newly registered Service Provider thereby;
   enabling the Agent to readily create own Internet-based collection of specialized Service Providers;
   extracting User real-time account balance information from a System Database;
   extracting Service Provider per minute compensation rate from the System Database;
   dividing the User account balance total by the Service provider per minute compensation rate;
   determining total minutes said User can connect to said Service provider until said User's account balance reaches zero;
   displaying this information to said User textually in pop-up window the moment before said User connects to said Service provider; and
   displaying a graphical timer in said pop-up window, once said User connects to said Service provider, begins counting down the minutes remaining for the User to be connected to the Service provider until said User's account balance is depleted and correspondingly their connection terminated; and
   connecting Users with these Service Providers for expert advice in real time via a telephone connection.

16. The method as described in claim 15, further comprising displaying within a pop-up window a full list of an Agent's Service Provider's and their individual availability statuses.

17. The method as described in claim 15, further comprising:
   monitoring how long telephonic connections are maintained between said Users and said Service Providers; and
   deducting from Users' consumer accounts the amounts based upon how long the telephonic connections are maintained.

18. The method as described in claim 15, further comprising:
allowing for said Users to remain in effect on the website of the Agent while navigating and using the system for connecting telephonically to Service Providers, by way of a series of progressive popup windows.

19. The method as described in claim 15, further comprising:
giving an Agent the option of self-managed payroll responsibility or,
a managed payout consisting of, deducting a pre-determined Agent service fee for each transaction and distributing the pre-determined Agent fee to said Agent's account.

20. The method as described in claim 15, further comprising:
having recognition, across an entire database of Service Provider's telephone numbers including potentially multiple different accounts, of whether a particular Service Provider's telephone line is busy thereby; and
enabling a Service Provider to register and be part of numerous different Agent groups, without concern for any potential telephone connection conflict.

\* \* \* \* \*